US007986388B2

(12) United States Patent
Harada

(10) Patent No.: US 7,986,388 B2
(45) Date of Patent: Jul. 26, 2011

(54) SUBSTRATE FILM FOR OPTICAL SHEETS, OPTICAL SHEET, AND LIQUID CRYSTAL DISPLAY MODULE

(75) Inventor: Kenichi Harada, Gobo (JP)

(73) Assignee: Keiwa Inc., Osaka (JP)

( * ) Notice: Subject to any disclaimer, the term of this patent is extended or adjusted under 35 U.S.C. 154(b) by 771 days.

(21) Appl. No.: 11/800,628

(22) Filed: May 7, 2007

(65) Prior Publication Data
US 2007/0269615 A1 Nov. 22, 2007

(30) Foreign Application Priority Data

May 9, 2006 (JP) ................. 2006-130886

(51) Int. Cl.
*G02F 1/1333* (2006.01)
*G02F 1/1335* (2006.01)
*F21V 7/04* (2006.01)
*F21V 11/00* (2006.01)
*G02B 5/02* (2006.01)
*H01J 5/16* (2006.01)
*H01P 5/00* (2006.01)

(52) U.S. Cl. ............. 349/122; 349/62; 349/63; 362/558
(58) Field of Classification Search .................... 349/62, 349/63, 122; 362/558
See application file for complete search history.

(56) References Cited

U.S. PATENT DOCUMENTS

| | | | |
|---|---|---|---|
| 5,587,816 A * | 12/1996 | Gunjima et al. ................. | 349/62 |
| 6,300,990 B1 | 10/2001 | Yamaguchi et al. | |
| 6,852,396 B1 | 2/2005 | Mineo | |
| 2004/0047163 A1 * | 3/2004 | Harada et al. ................. | 362/558 |
| 2005/0063062 A1 | 3/2005 | Ito et al. | |

FOREIGN PATENT DOCUMENTS

| | | |
|---|---|---|
| EP | 1 760 517 | 3/2007 |
| JP | 9-506985 | 7/1997 |
| JP | 10-161110 | 6/1998 |
| JP | 2000-162549 | * 11/1998 |
| JP | 11-295731 | 10/1999 |
| JP | 2000-019325 | 1/2000 |
| JP | 2000-089007 | 3/2000 |
| JP | 2004-004970 | 1/2004 |
| JP | 2004-037988 | 2/2004 |

(Continued)

*Primary Examiner* — Uyen-Chau N Le
*Assistant Examiner* — Kajli Prince
(74) *Attorney, Agent, or Firm* — Jordan and Hamburg LLP

(57) ABSTRACT

An object of the present invention is to provide a substrate film for optical sheets, an optical sheet and a backlight unit which can markedly enhance utilization efficiency of rays of light and dramatically increase luminance and which are suited for immediate beneath type liquid crystal display modules and the like. The present invention is characterized by a substrate film for optical sheets formed into a rectangular shape and made of a resin, in which the substrate film for optical sheets has an optical anisotropy, and the absolute value of an angle of the crystal orientation with respect to the short side orientation is $\pi/8$ or greater and $3\pi/8$ or less. The retardation value of the substrate film is preferably 70 nm or greater and 320 nm or less. Matrix resin constituting the substrate film is preferably polyethylene terephthalate or polycarbonate. The optical sheet of the present invention includes the substrate film for optical sheets, and an optical layer laminated on one face of the substrate film for optical sheets. The liquid crystal display module of the present invention has a liquid crystal display element, the optical sheet and an immediate beneath type backlight.

7 Claims, 6 Drawing Sheets

FOREIGN PATENT DOCUMENTS

| | | |
|---|---|---|
| JP | 2004-341294 | 12/2004 |
| JP | 2005-106959 | 4/2005 |
| JP | 2005-266323 | 9/2005 |
| KR | 10-0287350 | 1/2001 |
| KR | 10-2006-0031485 | 4/2006 |
| WO | WO-95/17692 | 6/1995 |

* cited by examiner (a)

(b)

SUBSTRATE FILM FOR OPTICAL SHEETS, OPTICAL SHEET, AND LIQUID CRYSTAL DISPLAY MODULE

BACKGROUND OF THE INVENTION

1. Field of Invention

The present invention relates to substrate films for optical sheet and optical sheets capable of markedly enhancing utilization efficiency of rays of light and improving luminance, and liquid crystal display modules using the same.

2. Description of the Related Art

Liquid crystal display (LCD) modules have been frequently used as a flat panel display through utilizing features such as thinness, lightness in weight, low level of electric power consumption and the like, and applications thereof have been increasing year by year as display devices for information such as mobile phones, personal digital assistances (PDA), personal computers and televisions. In recent years, properties demanded for liquid crystal display modules vary depending on their applications, but may include brightness (high luminance), visibility (widening of viewing angle), energy saving, thin and light modeling capability and the like. In particular, high luminance has been strongly desired.

Conventional common liquid crystal display modules have a structure in which as shown FIG. 6, a liquid crystal display element 51, a variety of optical sheets 52 and a backlight 53 are superposed from the front face side to the back face in this order. The liquid crystal display element 51 has a structure in which liquid crystal cell 56 is sandwiched between a pair of polarizing plates 54, 55, and various display modes such as TN and IPS were proposed. The backlight 53 allows the liquid crystal display element 51 to execute light emission by irradiating from the back face side, and modes such as edge light type (side light type), immediate beneath type and the like have been in widespread use. The various optical sheets 52 are superposed between the liquid crystal display element 51 and the backlight 53, and a light diffusion sheet, a prism sheet and the like are included having an optical function such as refraction and diffusion in an orientation along a normal line for the purpose of allowing the rays of light exited from the front face of the backlight 53 to enter into the entire face of the liquid crystal display element 51 efficiently and uniformly.

Generally used polarizing plates 54, 55 provided in the liquid crystal display element 51 are those which exhibit absorption dichroism, i.e., absorption of one directional component of a light accompanied by transmission of remaining polarization components. This type of the polarizing plates 54, 55 absorb 50% of the light, in principle, for achieving polarization, therefore, it falls under one great reason for deterioration of the utilization efficiency of the light in the liquid crystal display module.

In order to minimize the decrease in utilization efficiency of the light by the polarizing plates 54, 55, a technique of superposing a reflection polarizing plate (polarization splitter) on the back face side of the polarizing plate 55 positioned on the back face side in the liquid crystal display module, as well as a technique of using the reflection polarizing plate in place of the polarizing plate 55 positioned on the back face side were developed (for example, see JP-A-2005-106959, JP-T 9-506985 (the term "JP-T" as used herein means a published Japanese translation of a PCT application) and the like). In this reflection polarizing plate, the polarizing plate 55 positioned on the back face side allows transmission axis components to transmit directly, while other polarization components are allowed to return to the lower side, thereby recycling the rays of light.

On the other hand, the optical sheets 52 such as a light diffusion sheet, a prism sheet and the like provided in the liquid crystal display module generally include optical layers such as a transparent substrate layer made of a synthetic resin, a light diffusion layer laminated on the front face of this substrate layer, and a prism array layer (see, for example, JP-A Nos. 2000-89007, 2004-4970 and the like). The conventional optical sheet 52 is constructed such that the optical layer having a particular structure performs optical functions such as refraction, diffusion and the like in an orientation along a normal line, however, control of polarization characteristics of transmitted rays of light was not intended thereby.

In conventional liquid crystal display modules, the luminance was not satisfactorily secured while maintaining requirements for LCD, i.e., thin and light modeling by merely improving optical waveguide plate, cold-cathode tube and the like of the backlight 53.

Also, under the current circumstances, even in the case of the aforementioned liquid crystal display modules in which such reflection polarizing plates are used, just approximately 75% of the utilization efficiency of the rays of light can be achieved in fact due to loss of the recycled light caused by thermal absorption, reflection and the like.

SUMMARY OF THE INVENTION

The present invention was made in view of these disadvantages, and an object of the present invention is to provide a substrate film for optical sheets and an optical sheet which can markedly enhance utilization efficiency of rays of light and dramatically improving luminance and which are suited for immediate beneath type liquid crystal display modules and opposed edge light type liquid crystal display modules, and a liquid crystal display module using the same.

The present inventor elaborately investigated polarization characteristics of each constituent element of the liquid crystal display modules, and consequently found that decrease in utilization efficiency of the rays of light results from polarization of intensity of the rays of light reflected on the polarizing plate positioned on the back face side (back face side-polarizing plate) or the reflection polarizing plate of the liquid crystal display elements followed by returning to the backlight, and from inconsistency of the polarization orientation thereof with the orientation of the transmission axis of the back face side-polarizing plate or the reflection polarizing plate of the.

Consequently, one aspect of the present invention made for solving the aforementioned problems is a substrate film for optical sheets formed into a rectangular shape and made of a resin, which has an optical anisotropy, wherein the absolute value of an angle of the crystal orientation with respect to the short side orientation is $\pi/8$ or greater and $3\pi/8$ or less.

By thus constituting to have the substrate film for optical sheets having an optical anisotropy, and exhibiting the absolute value of an angle of the crystal orientation with respect to the short side orientation is $\pi/8$ or greater and $3\pi/8$ or less, polarization orientation of the retroreflected rays of light, which alternate by reflection on the back face side-polarizing plate or the reflection polarizing plate of the liquid crystal display element to the backlight side and reflection on the backlight, can be converted into the transmission axial orientation of the polarizing plate or the reflection polarizing plate (hereinafter, the function referred to as "polarizing function of the retroreflected rays of light"). As a result, ratio of attainment of the retroreflected rays of light to the liquid crystal cell, and in turn, utilization efficiency of the rays of light emitted from the lamp can be enhanced. Because the substrate film for optical sheets effectively performs polarizing functions of the retroreflected rays of light described above, the polarization characteristics of the outgoing rays of light of the backlight can be suitably used for immediate beneath type liquid crystal display modules and opposed edge light type liquid crystal display modules which are comparably isotropic.

The retardation value is preferably 70 nm or greater and 320 nm or less. The substrate film for optical sheets having such a retardation value optimizes the phase contrast such that the polarizing function of the retroreflected rays of light reflected on the polarizing plate and the like can be performed, whereby utilization efficiency of the rays of light can be markedly enhanced. Moreover, because the aforementioned numerical range of the retardation value is comparatively small as a retardation value for optimizing the phase contrast, ease of manufacture of the substrate film for optical sheets also becomes favorable.

Matrix resin constituting the substrate film is preferably polyethylene terephthalate or polycarbonate. This polyethylene terephthalate has a property to provide comparatively high retardation value, and the retardation value can be readily and certainly optimized as described above. Also, the retardation value can be readily regulated when polycarbonate is used.

The optical sheet made for solving the aforementioned problems has the substrate film for optical sheets, and an optical layer laminated on one face of the substrate film for optical sheets. The optical layer may be (a) one including multiple particles of a light diffusing agent and a binder therefor (light diffusion layer of light diffusion sheet), or (b) one having minute irregular shape having refractivity (prism array layer or the like of prism sheet). Because the optical sheet such as a light diffusion sheet and a prism sheet is generally used in liquid crystal display modules, by employing the substrate film for optical sheets having the aforementioned polarizing function of the retroreflected rays of light as the substrate film of the optical sheet generally provided as in the above manner, the polarizing function of the retroreflected rays of light reflected on the polarizing plate and the like can be imparted without leading to increase in number of the optical sheets to be provided in the liquid crystal display module, whereby utilization efficiency of the rays of light can be markedly enhanced, and luminance heightening and energy saving can be facilitated.

The optical sheet may have on another face of the substrate film a sticking preventive layer that includes beads dispersed in a binder. By thus providing the sticking preventive layer on another face of the substrate film for optical sheets, sticking is prevented between the optical sheet and the optical waveguide plate, the prism sheet or the like disposed to the back face side in, for example, the liquid crystal display modules.

The liquid crystal display module made for solving the aforementioned problems comprises (a) a liquid crystal display element in which a liquid crystal cell is sandwiched between a pair of polarizing plates, (b) an optical sheet overlaid on the back face side of the liquid crystal display element, and (c) a surface illuminant backlight of immediate beneath type or opposed edge light type overlaid on the back face side of the optical sheet. The liquid crystal display module markedly enhances utilization efficiency of the rays of light emitted from the lamp, and thus luminance heightening, energy saving, and thin and light modeling which have been socially demanded these days can be facilitated because the aforementioned optical sheet has a polarizing function of the retroreflected rays of light reflected on the polarizing plate and the like. Also, since the liquid crystal display module has an immediate beneath type or opposed edge light type backlight which has a comparably isotropic polarization characteristic of the outgoing rays of light, the polarizing function of the retroreflected rays of light reflected on the polarizing plate and the like can be effectively performed.

In the liquid crystal display module, a reflection polarizing plate may be provided in place of the back face side-polarizing plate of the liquid crystal display element, or between the liquid crystal display element and the optical sheet. By thus providing the reflection polarizing plate, efficiency of recycling of the rays of light can be enhanced in combination with the polarizing function of the retroreflected rays of light of the optical sheet, thereby leading to additional enhancement of the utilization efficiency of the rays of light emitted from the lamp.

When other optical sheet is provided between the liquid crystal display element and the backlight in the liquid crystal display module, a low-retardation film may be used as the substrate film of the other optical sheet. In general, liquid crystal display modules have multiple optical sheets such as light diffusion sheet, prism sheet and the like. When multiple optical sheets are provided in this manner, optimization and regulability of polarization to the transmission axial orientation of the polarizing plate and the like can be facilitated by imparting only to the substrate film of particular one optical sheet the aforementioned polarizing function of the retroreflected rays of light, while preventing conversion of the polarization orientation of the transmitted rays of light by other optical sheet.

Herein, the term "optical sheet" refers to such sheets also conceptually involving the aforementioned substrate film alone. The term "polarization orientation of the rays of light" means a direction including maximum polarization components of the rays of light on single plane. The term "angle of each orientation with respect to the short side orientation as a base" refers to the angle on single plane of each orientation, and means the angle represented by "+" in the clockwise rotation, while by "−" in the counterclockwise rotation provided that the short side orientation corresponds to 0°. The term "back face side" means the side opposite to the viewing side of the display of the liquid crystal display module. The term "retardation value (Re)" is a value calculated according to the formula: $Re=(ny-nx)d$, provided that the phase advancing axial orientation and phase retarding axial orientation, which are mutually orthogonal, among the crystallographic axial orientations on the plane of the front face of the substrate film is designated as x orientation and y orientation, respectively; the thickness of the substrate film is designated as d; refractive indexes in the x orientation and the y orientation is designated as nx and ny($nx \neq ny$). The term "low-retardation film" refers to a film having an absolute retardation value of equal to or less than 60 nm. The term "immediate beneath type liquid crystal display module" means a liquid crystal display module having an immediate beneath type backlight. The term "opposed edge light type liquid crystal display module" means a liquid crystal display module having an opposed edge light type backlight. The term "opposed edge light type backlight" means an edge light type backlight in which multiple lamps are disposed on the opposite side of the optical waveguide plate.

As in the foregoing, the substrate film for optical sheets and the optical sheet of the present invention have a function to actively convert the polarization orientation of the retroreflected rays of light reflected on the polarizing plate and the like to the transmission axial orientation of the polarizing plate and the like. Accordingly, the liquid crystal display module of the present invention having such an optical sheet markedly enhances utilization efficiency of the rays of light emitted from the lamp, and thus luminance heightening, energy saving, and thin and light modeling which have been socially demanded these days can be facilitated.

DESCRIPTION OF THE PREFERRED EMBODIMENTS

Figure 1:
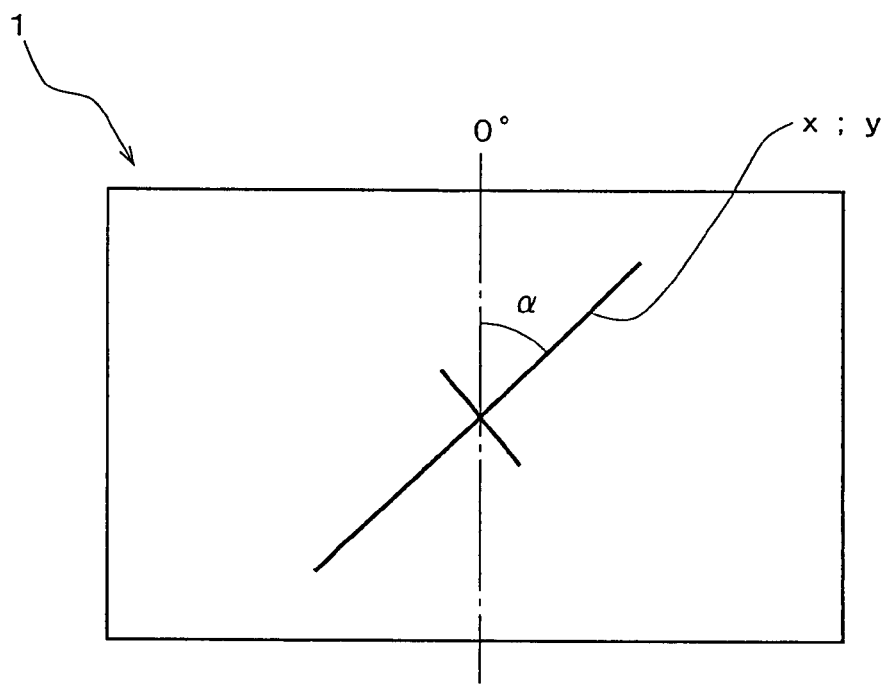
FIG. 1 shows a schematic plan view illustrating a substrate film for optical sheets according to one embodiment of the present invention.

Hereinafter, embodiments of the present invention will be described in detail with appropriate references to the drawing.

Substrate film 1 for optical sheets shown in FIG. 1 is a film made of a resin formed into a rectangular shape. As a material for forming the substrate film 1 for optical sheets, a transparent, particularly colorless and transparent, synthetic resin is used. This synthetic resin is not particularly limited, and examples thereof include e.g., polyethylene terephthalate, polyethylene naphthalate, acrylic resins, polycarbonate, polystyrene, polyolefin, cellulose acetate, weather resistant vinyl chloride and the like. Among them, polyethylene terephthalate or polycarbonate that is highly transparent, has high strength, and the retardation value of which can be readily regulated as described later is preferred. Particularly, polyethylene terephthalate having improved flexural performance is preferred.

Thickness of the substrate film 1 for optical sheets (average thickness) is not particularly limited, but is preferably 10 μm or greater and 250 μm or less, particularly preferably 20 μm or greater and 188 μm or less. When the substrate film 1 for optical sheets has a thickness being below the above range, disadvantages such as increasing possibility of generation of curling upon coating a polymer composition for forming the light diffusion layer or the like, and difficulty in handling, and the like may be caused. To the contrary, when the substrate film 1 for optical sheets has a thickness being beyond the above range, luminance of the liquid crystal display device may be lowered, and further may result in increase of thickness of the backlight unit, leading to production of a liquid crystal display device which does not fulfill the demand for thin modeling.

The substrate film 1 for optical sheets has an optical anisotropy, and specifically, has a birefringence exhibiting different refractive indices in the horizontal orientation, and has an optimized angle of the crystal orientation, and retardation value. This birefringence enables the substrate film 1 for optical sheets to convert the polarization orientation of the transmitted rays of light into an intended orientation.

In the substrate film 1 for optical sheets, absolute value of the angle α of the crystal orientation (x, y) with respect to the short side orientation is preferably π/8 or greater and 3π/8 or less, particularly preferably 3π/16 or greater and 5π/16 or less, and most preferably π/4. The substrate film 1 for optical sheets exhibiting the angle α of the crystal orientation falling within the above range can effectively convert the polarization orientation of the retroreflected rays of light reflected on the polarizing plate and the like into the transmission axial orientation of the polarizing plate and the like. The angle α of the crystal orientation was specified in terms of the absolute value as described above because the angle of the transmission axial orientation of the back face side-polarizing plate of liquid crystal display elements is 0° (parallel) with respect to the short side orientation in the liquid crystal display modules having a common immediate beneath type backlight, and the aforementioned polarizing function of the retroreflected rays of light is exerted similarly in both cases in which the angle α of the crystal orientation (x, y) shows plus and minus values with respect to the short side orientation.

The retardation value of the substrate film 1 for optical sheets is preferably 70 nm or greater and 320 nm or less, and particularly preferably 110 nm or greater and 170 nm or less. The substrate film 1 for optical sheets having a retardation value falling within this range can effectively convert the polarization orientation of the retroreflected rays of light reflected on the polarizing plate and the like into the transmission axial orientation of the polarizing plate and the like, and ease of manufacture is also favorable.

Process for producing the substrate film 1 for optical sheets is not particularly limited as long as the aforementioned crystallographic axial angle and the retardation value can be obtained. For example, the crystallographic axial angle can be regulated to fall within the range according to the present invention by adjusting stretching force, temperature and the like in the processing of uniaxial stretching of polyethylene terephthalate or the like, as well as by adjusting the position and angle of punching in the processing of punching of the biaxially stretched film. Moreover, the retardation value can be regulated by way of stretching force, temperature, film thickness or the like in the processing of stretching.

The substrate film 1 for optical sheets can convert the polarization orientation of the retroreflected rays of light, which alternate in the liquid crystal display module through reflection to the backlight side of the back face side-polarizing plate (or the reflection polarizing plate) of the liquid crystal display element and reflection on the backlight, into the transmission axial orientation of the polarizing plate or the reflection polarizing plate, whereby the utilization efficiency of the rays of light can be enhanced. In addition, the substrate film 1 for optical sheets can be suitably used in the liquid crystal display modules having an immediate beneath type backlight or opposed edge light type backlight having a comparably isotropic polarization characteristic of the outgoing rays of light, and thus the aforementioned polarizing function of the retroreflected rays of light reflected on the polarizing plate and the like can be effectively exerted.

Figure 2:
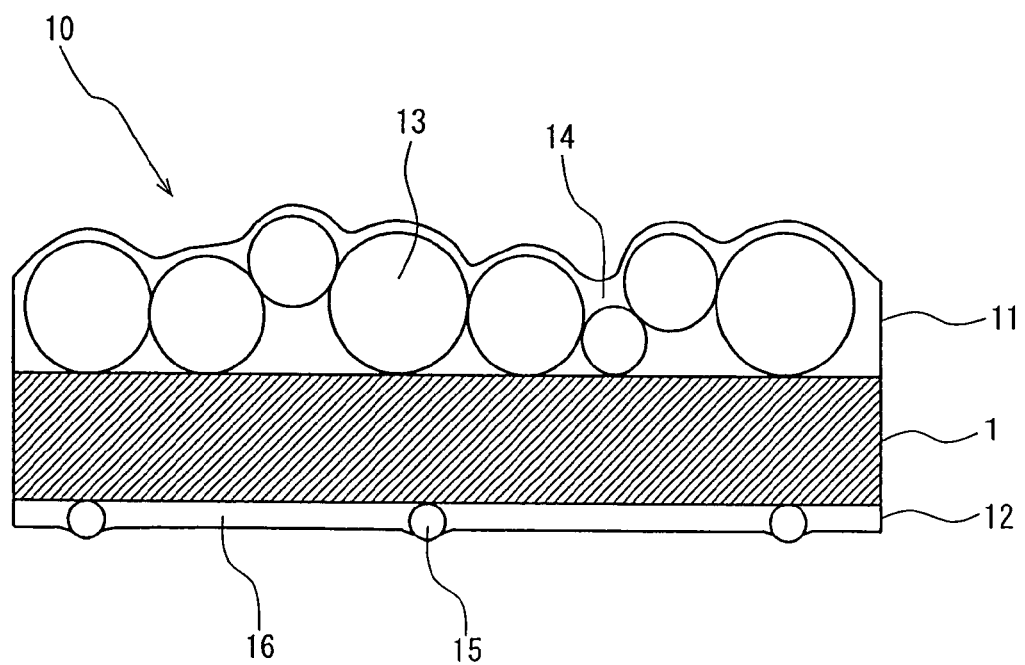
FIG. 2 shows a schematic cross-sectional view illustrating an optical sheet (light diffusion sheet) in which the substrate film for optical sheets shown in FIG. 1 is used.

The optical sheet 10 shown in FIG. 2 is a light diffusion sheet that has a light spread function to allow transmitted rays of light to be diffused (particularly, directional spread function to permit light condensing to the normal line orientation side while allowing to be diffused). The optical sheet 10 has the aforementioned substrate film 1 for optical sheets according to the present invention, an optical layer (light diffusion layer) 11 laminated on the front face of the substrate film 1 for optical sheets, and a sticking preventive layer 12 laminated on the back face of the substrate film 1 for optical sheets.

The optical layer 11 includes multiple particles of a light diffusing agent 13 provided over the front face of the substrate film 1 for optical sheets in a substantially uniform manner, and a binder 14 for the multiple particles of the light diffusing agent 13. The multiple particles of the light diffusing agent 13 are covered by the binder 14. The multiple particles of the light diffusing agent 13 included in the optical layer 11 in such a manner enable uniform diffusion of the rays of light which transmit the optical layer 11 from the back side to the front side. Moreover, micro recessions and protrusions are formed on the surface of the optical layer 11 in a substantially uniform manner by the multiple particles of the light diffusing agent 13. Owing to a refracting action of the micro recessions and protrusions like a lens thus formed on the front face of the optical sheet 10, the rays of light can be more efficiently diffused. Although the average thickness of the optical layer 11 is not particularly limited, it may be, for example, approximately 1 µm or greater and 30 µm or less.

The light diffusing agent 13 may be in the form of particles having a property to allow the rays of light to be diffused, and its candidates can be generally classified into inorganic fillers and organic fillers. Examples of the inorganic filler which may be used include e.g., silica, aluminum hydroxide, aluminum oxide, zinc oxide, barium sulfide, magnesium silicate, or any mixtures thereof. Examples of the material which may be used for the organic filler include e.g., acrylic resins, acrylonitrile resins, polyurethane, polyvinyl chloride, polystyrene, polyacrylonitrile, polyamide and the like. Among them, acrylic resins having high transparency are preferred, and in particular, polymethyl methacrylate (PMMA) is preferred.

Shape of the light diffusing agent 13 is not particularly limited, and examples thereof include e.g., spherical, spindle, needle-like, rod-like, cubic, plate-like, squamous, fibrous and the like. In particular, the shape of spherical beads excellent in the light diffusibility is preferred.

The lower limit of the average particle size of the light diffusing agent 13 is preferably 1 µm, particularly preferably 2 µm, and still more preferably 5 µm. In contrast, the upper limit of the mean particle size of the light diffusing agent 13 is preferably 50 µm, particularly preferably 20 µm, and still more preferably 15 µm. When the mean particle size of the light diffusing agent 13 is below the above range, less recessions and protrusions are provided on the surface of the optical layer 11 formed by the light diffusing agent 13, involving the probability of unsatisfactory light diffusing property required for the light diffusion sheet. To the contrary, when the mean particle size of the light diffusing agent 13 is beyond the above upper range, thickness of the optical sheet 10 is increased, and uniform diffusion may be difficult.

It is preferred that the lower limit of the amount of the light diffusing agent 13 (incorporated amount per 100 parts of the substrate polymer in the polymer composition being the material for forming the binder 14, which is calculated on the basis of the solid content) be 10 parts, particularly 20 parts, and still more 50 parts, and that the upper limit of the incorporated amount be 500 parts, particularly 300 parts, and still more 200 parts. The amount of the incorporated light diffusing agent 13 below the above range may result in insufficient light diffusibility, while the amount of the incorporated light diffusing agent 13 beyond the above range, to the contrary, may result in deterioration of the effect of fixing the light diffusing agent 13. High light diffusibility is not required in case of so called light diffusion sheets for upper use disposed to the front face side of the prism sheet, therefore, the amount of the incorporated light diffusing agent 13 may be preferably 10 parts or greater and 40 parts or less, particularly preferably 10 parts or greater and 30 parts or less.

The binder 14 can be formed by allowing a polymer composition containing a substrate polymer to be crosslinked and cured. This binder 14 disposes and fixes the light diffusing agent 13 on the front face of the substrate film 1 for optical sheets in a manner to provide substantially uniform density. Furthermore, for example, a fine inorganic filler, a curing agent, a plasticizer, a dispersant, any of various levelling agents, an ultraviolet ray-absorbing agent, an anti-oxidizing agent, a viscosity improving agent, a lubricant, a light stabilizer and the like may be blended ad libitum in the polymer composition for forming the binder 14, in addition to the substrate polymer.

The aforementioned substrate polymer is not particularly limited, and examples thereof include e.g., acrylic resins, polyurethane, polyesters, fluorine based resins, silicone based resins, polyamide imide, epoxy resins, ultraviolet-curable resins and the like. One or two or more of these polymers may be used as a mixture. Particularly, a highly processable polyol that can be readily formed into the optical layer 11 by a means such as coating or the like is preferred as the substrate polymer. Furthermore, the substrate polymer per se which may be used for the binder 14 is preferably transparent, and particularly preferably transparent and colorless in light of improvement of the transmittivity of the rays of light.

Examples of the polyol include e.g., polyols obtained by polymerizing a monomer component including a hydroxyl group-containing unsaturated monomer, polyester polyols obtained under a condition with excessive hydroxyl groups present, and the like. These may be used alone or two or more of them may be used as a mixture.

Examples of the hydroxyl group-containing unsaturated monomer include (a) hydroxyl group-containing unsaturated monomers such as e.g., 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol, and crotonyl alcohol, and (b) hydroxyl group-containing unsaturated monomers obtained by a reaction of a dihydric alcohol or an epoxy compound such as e.g., ethylene glycol, ethylene oxide, propylene glycol, propylene oxide, butylene glycol, butylene oxide, 1,4-bis (hydroxymethyl)cyclohexane, phenylglycidyl ether, glycidyl decanoate or PRACCEL FM-1 (manufactured by Daicel Chemical Industries, Ltd.), with an unsaturated carboxylic acid such as e.g., acrylic acid, methacrylic acid, maleic acid, fumaric acid, crotonic acid or itaconic acid. The polyol can be manufactured by polymerizing one or two or more selected from these hydroxyl group-containing unsaturated monomers.

Moreover, the polyol can be also manufactured by polymerizing one or two or more ethylenic unsaturated monomers selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycidyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetone acrylamide, ethylene, propylene, isoprene and the like, with the hydroxyl group-containing unsaturated monomer selected from those in the above (a) and (b).

The polymer obtained by polymerizing the monomer component including the hydroxyl group-containing unsaturated monomer may have a number average molecular weight of 1000 or greater and 500000 or less, and preferably 5000 or greater and 100000 or less. Furthermore, the hydroxyl value may be 5 or greater and 300 or less, preferably 10 or greater and 200 or less, and more preferably 20 or greater and 150 or less.

The polyester polyol obtained under a condition with excessive hydroxyl groups being present can be manufactured by allowing a reaction of (c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol A, bis(hydroxymethyl) cyclohexane, hydroquinone bis(hydroxyethyl ether), tris(hydroxyethyl)isocyanurate or xylylene glycol with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which number of the hydroxyl groups in the polyhydric alcohol such as propanediol, hexanediol, polyethylene glycol, trimethylolpropane or the like is greater than number of the carboxy groups of the aforementioned polybasic acid.

Number average molecular weight of the polyester polyol obtained under the condition with excessive hydroxyl groups being present may be 500 or greater and 300000 or less, and more preferably 2000 or greater and 100000 or less. Additionally, the hydroxyl value may be 5 or greater and 300 or less, preferably 10 or greater and 200 or less, and more preferably 20 or greater and 150 or less.

The polyol for use as the substrate polymer of the polymer composition may be preferably an acryl polyol which is obtained by polymerizing the aforementioned polyester polyol, and a monomer component comprising the hydroxyl group-containing unsaturated monomer, and which has a (meth) acrylic unit or the like. The binder 14 including the polyester polyol or acryl polyol as the substrate polymer is highly weather-resistant, and yellowing of the optical layer 11 and the like can be suppressed. Either one of this polyester polyol or the acryl polyol may be used, alternatively, both of them may be used.

Number of the hydroxyl groups in the polyester polyol and the acryl polyol is not particularly limited as long as it is two or more per molecule, however, when the hydroxyl value in the solid content is equal to or less than 10, crosslinking points may be reduced and thus, film physical properties such as solvent resistance, water resistance, heat resistance, surface hardness and the like are liable to be decreased.

A fine inorganic filler may be included in the polymer composition that forms the binder 14. By including the fine inorganic filler in this binder 14, heat resistance of the optical layer 11, and in turn, of the optical sheet 10 may be improved. Inorganic matter that constitutes this fine inorganic filler is not particularly limited, but an inorganic oxide is preferred. This inorganic oxide is defined as any one of a variety of oxygen-containing metal compounds in which a metal element forms a three dimensional network predominantly via bonds with an oxygen atom. The metal element that constitutes the inorganic oxide is preferably an element selected from, for example, those in the group II-VI of the periodic table of the elements, and more preferably an element selected from those in the group III-V of the periodic table of the elements. Particularly, an element selected from Si, Al, Ti and Zr is preferred. Colloidal silica in which the metal element is Si is most preferred as the fine inorganic filler in terms of the effect to improve the heat resistance and uniform dispersibility. Also, the shape of the fine inorganic filler is not particularly limited, but may be an optional particle shape such as spherical, needle-like, plate-like, squamous, granular or the like.

The lower limit of the mean particle size of the fine inorganic filler is preferably 5 nm, and particularly preferably 10 nm. In contrast, the upper limit of the mean particle size of the fine inorganic filler is preferably 50 nm, and particularly preferably 25 nm. When the mean particle size of the fine inorganic filler is below the above range, surface energy of the fine inorganic filler becomes so high that aggregation or the like is likely to occur. To the contrary, the mean particle size of the fine inorganic filler being beyond the above range may cause white turbidity due to the influences of the short-wavelength, leading to failure in completely maintaining the transparency of the optical sheet 10.

The lower limit of the amount of the fine inorganic filler (amount of the incorporated inorganic substance component alone) per 100 parts by weight of the substrate polymer is preferably 5 parts, and particularly preferably 50 parts calculated on the basis of the solid content. In contrast, the upper limit of the amount of the incorporated fine inorganic filler is preferably 500 parts, more preferably 200 parts, and particularly preferably 100 parts. When the amount of the incorporated fine inorganic filler is below the above range, the optical sheet 10 may not develop heat resistance enough, to the contrary, when the amount is beyond the above range, blending in the polymer composition may be difficult, which may result in lowering of the light transmittivity of the optical layer 11.

As the fine inorganic filler, one having an organic polymer fixed on the surface thereof may be used. By thus using the organic polymer-fixed fine inorganic filler, improvement of dispersibility in the binder 14 and affinity with the binder 14 may be contemplated. This organic polymer is not particularly limited with respect to the molecular weight, shape, composition, presence of the functional group and the like, but an arbitrary organic polymer may be used. Furthermore, in connection with the shape of the organic polymer, any arbitrary shape such as a straight, branched or crosslinked structure may be used.

Specific examples of the resin constituting the organic polymer include e.g., (meth)acrylic resins, polystyrene, polyvinyl acetate, polyolefin such as polyethylene and polypropylene, polyvinyl chloride, polyvinylidene chloride, polyesters such as polyethylene terephthalate, copolymers of the same as well as these resins partially modified with a functional group such as an amino group, an epoxy group, a hydroxyl group or a carboxyl group, and the like. Among them, those including an organic polymer which contains a (meth)acrylic unit such as a (meth)acrylic resin, a (meth)acryl-styrene based resin or a (meth)acryl-polyester based resin as an essential component are suited because of their film formation ability. On the other hand, resins having miscibility with the substrate polymer of the aforementioned polymer composition are preferred, therefore, one having the same composition as the substrate polymer included in the polymer composition is most preferred.

The fine inorganic filler may include an organic polymer within the fine particle. Accordingly, adequate softness and toughness can be imparted to the inorganic substance that is a core of the fine inorganic filler.

As the organic polymer, one containing an alkoxy group may be preferably used, with the content of the same being 0.01 mmol or grater and 50 mmol or less per gram of the fine inorganic filler to which the organic polymer was fixed. Such an alkoxy group can improve affinity with a matrix resin that constitutes the binder 14, and dispersibility in the binder 14.

The alkoxy group described above means an RO group bound to a metal element that forms the skeleton of the fine particle. R herein represents an alkyl group which may be substituted, and the RO group in the fine particle may be the same or different. Specific examples of R include methyl, ethyl, n-propyl, isopropyl, n-butyl and the like. It is preferred that a metal alkoxy group be used which includes the same metal as that constituting the fine inorganic filler. When the fine inorganic filler is colloidal silica, an alkoxy group including silicon as the metal may be preferably used.

Although percentage content of the organic polymer in the fine inorganic filler to which the organic polymer was fixed is not particularly limited, its content is preferably equal to or greater than 0.5% by weight and equal to or less than 50% by weight based on the fine inorganic filler.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 14. Accordingly, the fine inorganic filler and the matrix resin of the binder 14 are bound via a crosslinking structure, leading to excellent stability upon preservation, stain resistance, flexibility, weather resistance and the like. Furthermore, the resulting coated film can be glossy.

As the aforementioned substrate polymer, a polyol having a cycloalkyl group is preferred. By thus introducing a cycloalkyl group into the polyol as the substrate polymer constituting the binder 14, hydrophobicity of the binder 14 may be elevated to improve water repellency, water resistance and the like. Accordingly, deflection resistance, size stability and the like of the optical sheet 10 under high temperature and high humidity conditions can be improved. Additionally, basic film coating performances such as weather resistance, hardness, bulky feeling, solvent resistance and the like of the optical layer 11 may be improved. Moreover, affinity with the fine inorganic filler to which the organic polymer was fixed on the surface thereof, and uniform dispersibility of the fine inorganic filler may be further favorable.

The cycloalkyl group is not particularly limited, and examples thereof include e.g., cyclobutyl groups, cyclopentyl groups, cyclohexyl groups, cycloheptyl groups, cyclooctyl groups, cyclononyl groups, cyclodecyl groups, cycloundecyl groups, cyclododecyl groups, cyclotridecyl groups, cyclotetradecyl groups, cyclopentadecyl groups, cyclohexadecyl groups, cycloheptadecyl groups, cyclooctadecyl groups and the like.

The polyol having the cycloalkyl group is obtained by copolymerization of a polymerizable unsaturated monomer having a cycloalkyl group. Such a polymerizable unsaturated monomer having a cycloalkyl group is a polymerizable unsaturated monomer having at least one cycloalkyl group within the molecule. This polymerizable unsaturated monomer is not particularly limited, and examples thereof include e.g., cyclohexyl(meth)acrylate, methylcyclohexyl(meth)acrylate, tert-butylcyclohexyl(meth)acrylate, cyclododecyl(meth) acrylate and the like.

Also, isocyanate may be included as a curing agent in the polymer composition. By thus including the isocyanate curing agent in the polymer composition, even more rigid crosslinking structure is provided, thereby further improving the physical film properties of the optical layer 11. Similar substance to the polyfunctional isocyanate compound as described above may be used as the isocyanate. Among all, aliphatic isocyanate is preferred which prevents the coated film from yellowing.

Particularly, when the polyol is used as the substrate polymer, any one of hexamethylene diisocyanate, isophorone diisocyanate and xylene diisocyanate, or two or more thereof as a mixture may be used as the curing agent to be blended in the polymer composition. When such a curing agent is used, velocity of the curing reaction of the polymer composition is elevated, therefore, lowering of the velocity of the curing reaction due to the cationic antistatic agent can be sufficiently compensated even though a cationic substance that is responsible for dispersion stability of the fine inorganic filler is used as the antistatic agent. Also, elevation of the velocity of the curing reaction of the polymer composition is responsible for uniform dispersibility of the fine inorganic filler in the binder. As a consequence, the optical sheet 10 can markedly suppress deflection and yellowing due to heat, ultraviolet ray and the like.

Furthermore, an antistatic agent may be blended and kneaded in the polymer composition. Through forming a binder 14 from the polymer composition blended and kneaded with the antistatic agent in such a manner, the optical sheet 10 exerts an antistatic effect, thereby enabling the prevention of disadvantages resulting from electrification with static electricity such as attraction of dust, getting into a difficulty in overlaying with a prism sheet or the like, and the like. Moreover, although coating the antistatic agent on a surface results in stickiness or pollution of the surface, such negative effects may be reduced by blending and kneading it in the polymer composition. This antistatic agent is not particularly limited, and examples thereof which may be used include e.g., anionic antistatic agents such as alkyl sulfate, alkyl phosphate and the like; cationic antistatic agents such as quaternary ammonium salts, imidazoline compounds and the like; nonionic antistatic agents such as polyethyleneglycol based compounds, polyoxyethylene sorbitan monostearate esters, ethanol amides and the like; polymeric antistatic agents such as polyacrylic acid, and the like. Among them, cationic antistatic agents are preferred having comparatively strong antistatic effects, which may exert an anti-static effect by merely adding in a small amount.

The sticking preventive layer 12 includes multiple beads 15 disposed on the back face of the substrate film 1 for optical sheets in a scattered manner, and a binder 16 for the multiple beads 15. This binder 16 is also formed by crosslinking and curing a polymer composition which is similar to one for the binder 14 of the optical layer 11 as described above. Moreover, as the material for the beads 15, similar ones to the light diffusing agent 13 for the optical layer 11 may be used. In addition, the thickness of the sticking preventive layer 12 (the thickness of the binder 16 portion, at a part where the beads 15 are not present) is not particularly limited, however for example, it is set to be around 1 μm or greater and 10 μm or less.

The amount of the incorporated beads 15 is set to be relatively small. The beads 15 are dispersed in the binder 16 spacing apart with each other. In addition, protrusions are formed on the under surface of the optical sheet 10 at the parts where the beads 15 are present. Thus, when this optical sheet 10 is disposed to overlay the optical waveguide plate, the protruded portions of the beads 15 are brought into contact with the surface of the optical waveguide plate or the like, and thus contact of the entire surface of the back face of the optical sheet 10 with the optical waveguide plate or the like is avoided. Sticking between the optical sheet 10 and the optical waveguide plate is thereby prevented, leading to suppression of the lack in uniformity of the brightness of the window of a liquid crystal display apparatus.

Next, process for producing the optical sheet 10 will be explained below. The process for producing the optical sheet 10 comprises: (a) a step of preparing a composition for the optical layer through admixing the light diffusing agent 13 with a polymer composition that constitutes the binder 14; (b) a step of overlaying and curing the polymer composition for the optical layer on the front face of the substrate film 1 for optical sheets to form the optical layer 11; (c) a step of preparing a composition for the sticking preventive layer through admixing beads 15 with a polymer composition that constitutes the binder 16; and (d) a step of overlaying and curing the composition for the sticking preventive layer on the back face of the substrate film 1 for optical sheets to laminate the sticking preventive layer 12. Means for overlay to laminate the composition for the optical layer and the composition for the sticking preventive layer on the substrate film 1 for optical sheets is not particularly limited, but, for example, coating in which a bar coater, a blade coater, a spin coater, a roll coater, a gravure coater, a flow coater, a spray, screen printing or the like is used may be employed.

The optical sheet 10 has an excellent light spread function (directional light diffusion function) due to the reflection and refraction at the interface of the light diffusing agent 13 included in the optical layer 11, and the refraction on the micro recessions and protrusions formed on the front face of the optical layer 11. In addition, the optical sheet 10 can actively convert the polarization orientation of the retroreflected rays of light reflected on the polarizing plate and the like into the transmission axial orientation of the polarizing plate and the like by means of the substrate film 1 for optical sheets. Therefore, the optical sheet 10 can markedly enhance utilization efficiency of the rays of light emitted from the lamp when it is used in liquid crystal display modules, and thus luminance heightening and energy-saving modeling, as well as space-saving modeling, in turn, can be facilitated.

Figure 3:
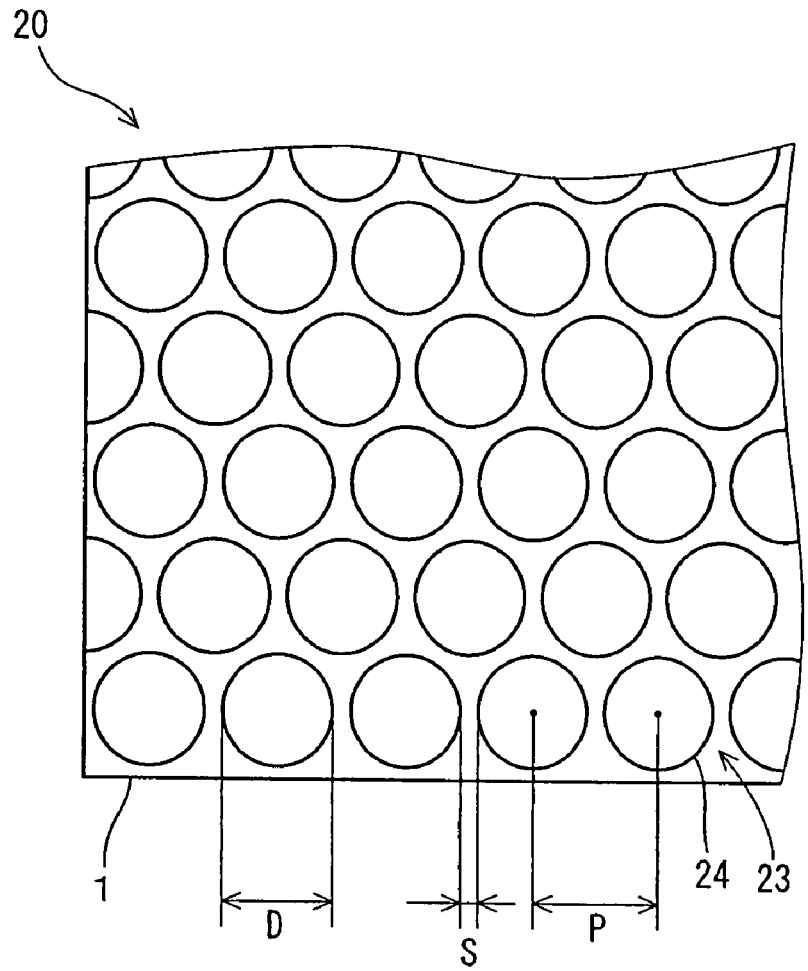
FIGS. 3(a) and (b) show a schematic plan view and a schematic cross-sectional view illustrating an optical sheet (microlens sheet) in which the substrate film for optical sheets shown in FIG. 1 is used.
Figure 3:
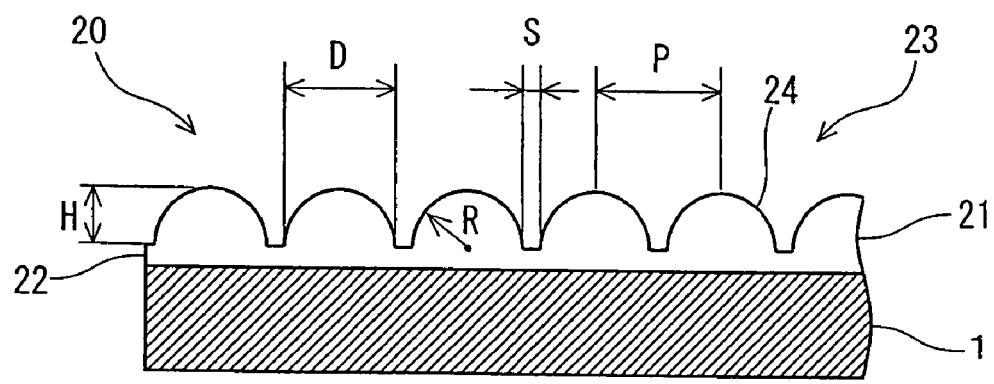

Optical sheet 20 shown in FIG. 3 is a so called microlens sheet having optical functions such as high light condensation, and refraction and diffusion toward the side of the normal line orientation. The optical sheet 20 has the substrate film 1 for optical sheets, and an optical layer 21 laminated on the front face of the substrate film 1 for optical sheets.

The optical layer 21 has a sheet-shaped part 22 laminated on the front face of the substrate film 1 for optical sheets, and a microlens array 23 formed on the front face of the sheet-shaped part 22. The optical layer 21 can be constructed with only the microlens array 23 without providing the sheet-shaped part 22. In other words, it is also possible to form the microlens array 23 directly on the front face of the substrate film 1 for optical sheets.

The optical layer 21 is formed from a transparent, particularly, colorless and transparent synthetic resin, because transmission of rays of light is required. Examples of the synthetic resin which may be used for the optical layer 21 include e.g., polyethylene terephthalate, polyethylene naphthalate, acrylic resins, polycarbonate, polystyrene, polyolefin, cellulose acetate, weather resistant vinyl chloride, active energy beam curable resins, and the like. Among them, radiation curable resins such as ultraviolet ray curable resins, electron beam curable resins and the like being excellent in formability of the microlens array 23, as well as polyethylene terephthalate having excellent transparency and high strength are particularly preferred. In the optical layer 21 may be blended, for example, a filler, a plasticizer, a stabilizer, an antidegradant, a dispersant and the like, in addition to the aforementioned synthetic resin.

The microlens array 23 is constructed with a number of microlenses 24. This microlens 24 has a hemi-spherical shape (including the shape approximately to a hemisphere), and is provided to protrude on the front face side of the substrate film 1 for optical sheets. The microlens 24 is not limited to the aforementioned hemi-spherical convex lens, but the microlens being a hemi-spherical concave lens is also acceptable. Such microlens being the hemi-spherical concave lens also has excellent optical functions similarly to the microlens 24 as described above.

The microlenses 24 are arranged on the front face of the substrate film 1 for optical sheets in a comparatively dense and geometrical manner. Specifically, the microlenses 24 are arranged on the front face of the substrate film 1 for optical sheets in a regular triangular lattice pattern. Therefore, pitches (P) of the microlenses 24, and distances (S) between the lenses have entirely constant values, respectively. This arrangement pattern enables the microlenses 24 to be arranged in a most dense manner. The arrangement pattern of the microlenses 24 is not limited to the aforementioned regular triangular lattice pattern which enables dense filling but, for example, any of regular tetragonal lattice patterns and random patterns can also be employed. According to this random pattern, appearance of the moire can be reduced which may be caused when the optical sheet 20 overlaid on other optical member.

It is preferred that the lower limit of the diameter (D) of the microlens 24 is 10 μm, particularly 100 μm, and further particularly 200 μm. In contrast, the upper limit of the diameter (D) of the microlens 24 is preferably 1000 μm, and particularly preferably 700 μm. When the diameter (D) of the microlens 24 is smaller than 10 μm, diffraction may greatly affect to facilitate the occurrence of decrement of the optical performances and color separation, thereby leading to deterioration of the quality. To the contrary, when the microlens 24 has a diameter (D) of greater than 1000 μm, increase in the thickness and lack in uniformity of the luminance are liable to be caused, which may thereby lead to deterioration of the quality. In addition, by setting the diameter (D) of the microlens 24 to be equal to or greater than 100 μm, the microlenses 24 decrease in number per unit area. Consequently, enlargement of the planar dimension of the optical sheet 20 being the microlens sheet can be readily performed, and thus technical and economic burdens in production can be reduced.

The lower limit of surface roughness (Ra) of the microlens 24 is preferably 0.01 μm, and particularly preferably 0.03 μm. In contrast, the upper limit of the surface roughness (Ra) of the microlens 24 is preferably 0.1 μm, and particularly preferably 0.07 μm. By thus setting the surface roughness (Ra) of the microlens 24 to be equal to or greater than the above lower limit, formation of the microlens array 23 of the optical sheet 20 is comparatively facilitated, and thus technical and economic burdens in terms of the production can be reduced. To the contrary, by setting the surface roughness (Ra) of the microlens 24 to be less than the above upper limit, scattering of the light on the front face of the microlens 24 is decreased. Consequently, a light condensing function and a refraction function to the side of the normal line orientation by the microlens 24 are enhanced, and high luminance of the front orientation can be achieved resulting from such favorable optical functions.

The lower limit of the height ratio (H/R) of the height (H) of the microlens 24 to the curvature radius (R) is preferably 5/8, and particularly preferably 3/4. In contrast, the upper limit of this height ratio (H/R) is preferably 1. By thus making the height ratio (H/R) of the microlens 24 fall within the above range, a lens-like refracting action in the microlens 24 is effectively exhibited, and the optical functions such as light condensation and the like of the optical sheet 20 can be markedly enhanced.

The upper limit of the spacing ratio (S/D) of the distance (S; P-D) between the lenses to the diameter (D) of the microlenses 24 is preferably 1/2, and particularly preferably 1/5. By thus setting the distance (S) between the microlenses 24 to be equal to or less than the above upper limit, flat part which is not responsible for the optical functions can be decreased, and thus the optical functions such as light condensation and the like of the optical sheet 20 can be markedly improved.

The lower limit of the filling rate of the microlens 24 is preferably 40%, and particularly preferably 60%. By thus setting the filling rate of the microlens 24 to be equal to or greater than the above lower limit, occupied area of the microlens 24 in the front face of the optical sheet 20 can be increased, and thus the optical functions such as light condensation and the like of the optical sheet 20 can be markedly improved.

Numerical ranges of the aforementioned height ratio (H/R), spacing ratio (S/D) and filling rate were deduced on the basis of luminance analysis simulation by nonsequential tracing of the rays of light using a Monte Carlo method.

The lower limit of the refractive index of the material constituting the optical layer 21 is preferably 1.3, and particularly preferably 1.45. In contrast, the upper limit of the refractive index of this material is preferably 1.8, and particularly preferably 1.6. Within this range, the refractive index of the material constituting the optical layer 21 is most preferably 1.5. By thus making the refractive index of the material constituting the optical layer 21 fall within the above range, a lens-like refracting action in the microlens 24 is effectively exhibited, and the optical functions such as light condensation and the like of the optical sheet 20 can be further enhanced.

Process for producing the optical sheet 20 is not particularly limited as long as one having the constitution as described above can be formed, and any of various processes can be adopted. Specific examples of the process for producing the optical sheet 20 include those in the followings:

(a) a process for forming the optical sheet 20 by laminating a synthetic resin and the substrate film 1 for optical sheets in this order in a sheet mold having an inverted shape of the front face of the microlens array 23, and stripping off the sheet mold;

(b) a process in which a resin formed into a sheet is heated again, which is sandwiched between a metal plate and a mold having an inverted shape of the front face of the microlens array 23, together with the substrate film 1 for optical sheets, and then they are pressed to transfer the shape;

(c) an extrusion sheet forming process in which a molten resin and the substrate film 1 for optical sheets are passed through a nip between a roll mold having, on its inner circumference, an inverted shape of the front face of the microlens array 23 and another roll to transfer the shape;

(d) a process in which an ultraviolet ray curable resin is coated on the substrate film 1 for optical sheets, pressed on a sheet mold, a mold or a roll mold having the inverted shape that is similar to the aforementioned one to transfer the shape to the uncured ultraviolet ray curable resin, and then the ultraviolet ray curable resin is exposed to an ultraviolet ray to permit curing;

(e) a process in which an uncured ultraviolet ray curable resin is filled for coating in a mold or a roll mold having the inverted shape that is similar to the aforementioned one, pressing it with the substrate film 1 for optical sheets to be uniform, and then the ultraviolet ray curable resin is exposed to an ultraviolet ray to permit curing;

(f) a process in which an uncured (liquid) ultraviolet ray curable resin or the like is sprayed or discharged from a minute nozzle such that the microlenses 24 are formed on the substrate film 1 for optical sheets, and is then cured;

(g) A process in which an electron beam curable resin is used in place of the ultraviolet ray curable resin in the above processes (d) to (f), and the like.

In the method of manufacturing the mold having an inverted shape of the microlens array 23, it can be manufactured by, for example: producing a microlens array model through forming a patchy spatial pattern with a photoresist material on a substrate and subjecting this spatial pattern to heat fluidization to thereby make a curved face; laminating a metal layer on the front face of this microlens array model by electroforming; and peeling off this metal layer. Also, as the process for producing the aforementioned microlens array model, a process described in the above item (f) can be employed.

According to the method of the manufacture as described above, the microlens array 23 having an arbitrary shape is formed in an easy and accurate manner. Therefore, the diameter (D), the height ratio (H/R), the spacing ratio (S/D), the filling rate and the like of the microlenses 24 constructing the microlens array 23 can be regulated in an easy and accurate manner. As a result, the optical functions of the optical sheet 20 can be controlled in an easy and accurate manner.

The optical sheet 20 has optical functions such as high light condensation, refraction to the normal line orientation, diffusion and the like by means of the microlens array 23. In addition, the optical functions can be controlled in an easy and accurate manner. Thus, the optical sheet 20 can control, for example, the peak direction of the incoming rays of light to the prism sheet of the backlight unit to give the most suitable angle of gradient for refraction toward the normal line orientation. Moreover, the optical sheet 20 can actively convert the polarization orientation of the retroreflected rays of light reflected on the polarizing plate and the like into the transmission axial orientation of the polarizing plate and the like by means of the substrate film 1 for optical sheets. Therefore, the optical sheet 20 can markedly enhance utilization efficiency of the rays of light when it is used in liquid crystal display modules, and thus luminance heightening and energy-saving modeling, as well as space-saving modeling, in turn, can be facilitated.

The term "microlens" referred to above means a minute lens having a partial spherical surface at the interface, and pertinent examples thereof include e.g., hemispherical convex lenses, hemispherical concave lenses and the like. The term "diameter (D)" herein means a diameter of the microlens at its base or opening. The term "height (H)" herein means a distance in a vertical direction from the basal plane to the top of the microlens in case of the microlens being a convex lens, and a distance in a vertical direction from the opening to the bottom of the microlens in case of the microlens being a concave lens. The term "distances between the lenses" herein means the shortest distance between a pair of adjacent microlenses. The term "filling rate" herein means a ratio of the area of the microlenses per unit area in the projection shape of the front face. The term "regular triangular lattice pattern" herein means a pattern generated by dividing the front face into regular triangular compartments having the same shape, and arranging the microlenses at each vertex of the regular triangle.

Figure 4:
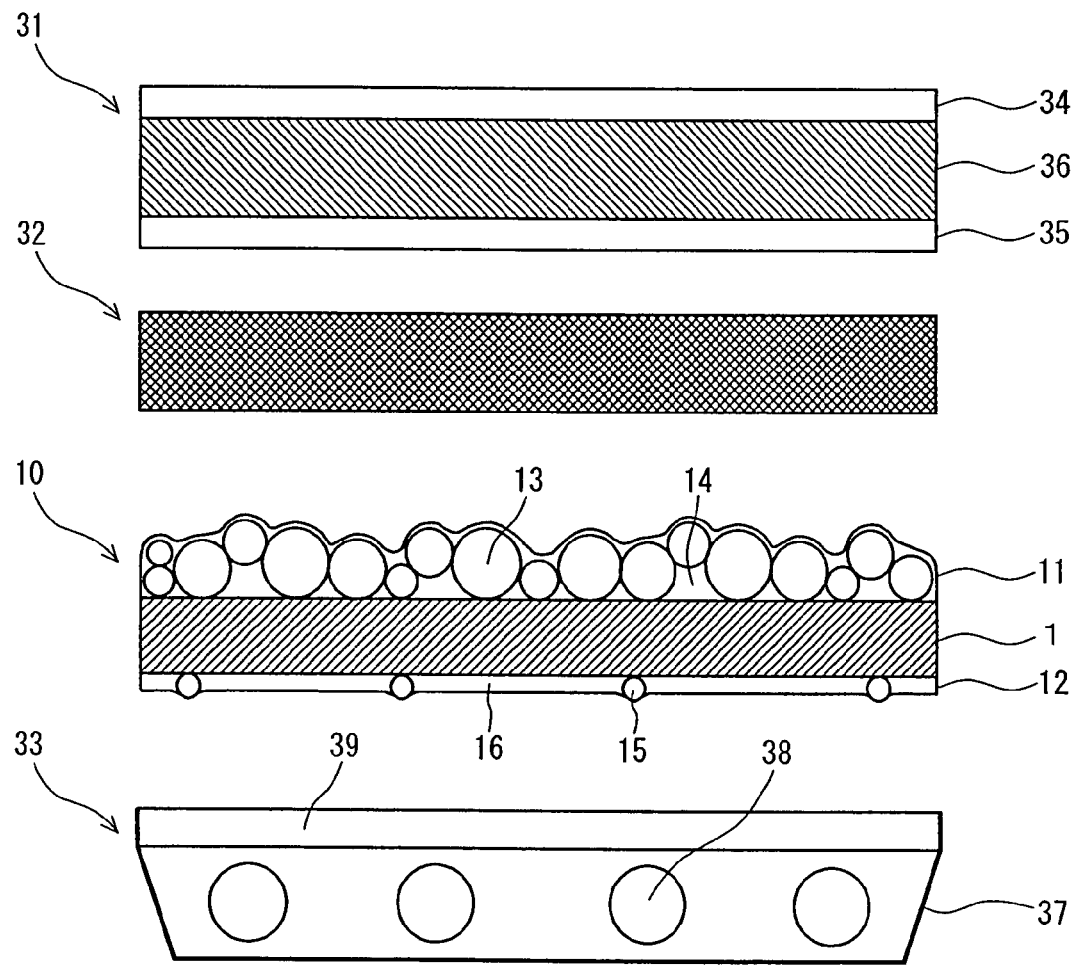
FIG. 4 shows a schematic cross-sectional view illustrating a liquid crystal display module having the optical sheet shown in FIG. 2.

Liquid crystal display module shown in FIG. 4 has a liquid crystal display element 31, a reflection polarizing plate 32, an optical sheet 10 and a backlight 33. The liquid crystal display element 31, the reflection polarizing plate 32, the optical sheet 10 and the backlight 33 (light-outcoming face) have a substantially same and rectangular shape in plan, and they are superposed in this order from the front face side to the back face side.

The liquid crystal display element 31 has a front face side-polarizing plate 34 and a back face side-polarizing plate 35 which are disposed in a substantially parallel manner with a certain interval, and a liquid crystal cell 36 sandwiched therebetween. The polarizing plates 34, 35 are not particularly limited, but generally constructed with polarizers such as an iodine-based polarizer, a dye-based polarizer and a polyene-based polarizer, and two pieces of transparent protective films disposed on both sides of the same. The front face side-polarizing plate 34 and the back face side-polarizing plate 35 are constructed such that their transmission axial orientations are orthogonal each other, and that the transmission axial orientation of the back face side-polarizing plate 35 is parallel to the short side orientation (i.e., parallel to the lamp 38).

The liquid crystal cell 36 has a function to control the amount of transmitted light, and a variety of known ones may be employed. The liquid crystal cell 36 has generally a layer structure constituted with a basal plate, a color filter, a counter electrode, a liquid crystal layer, a pixel electrode, and a basal plate. For this pixel electrode, a transparent conductive film such as ITO or the like may be used. As a display mode of the liquid crystal cell 36, for example, TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), HAN (Hybrid Aligned Nematic) or the like proposed hitherto may be used.

The reflection polarizing plate 32 has a function to separate the reflected beams and the transmitted beams on the basis of polarization characteristics. For example, trade name "D-BEF" manufactured by Sumitomo 3M Limited, trade name "PCF" manufactured by NITTO DENKO CORPORATION and the like may be used. The transmission axial orientation of this reflection polarizing plate 32 is arranged to be in parallel to the transmission axial orientation of the back face side-polarizing plate 35 of the liquid crystal display element 31. Therefore, the reflection polarizing plate 32 is constructed such that the polarization components that run along the transmission axial orientation of the back face side-polarizing plate 35 are transmitted among the rays of light incoming from the back face side, and that the polarization components that run along the reflection axial orientation are recycled following reflection toward the back face side.

The backlight 33 is a surface illuminant apparatus of immediate beneath type, which illuminates the liquid crystal display element 31 from the back face side to permit light emission. As the backlight 33, for example, ones disclosed in JP-A-H11-295731 and the like are known. Specifically, a casing 37, multiple lamps 38, a diffusion plate 39 and the like are included as major constitutive elements. The casing 37 is formed to give a rectangular tray-like shape (thin box-like shape with the front face side open), and has a reflection layer such as a metal film or the like on the inner face so as to exit the rays of light toward the front face side. The multiple lamps 38 are linear light sources such as cold-cathode tubes, which are disposed in parallel inside of the casing 37 at regular intervals. The diffusion plate 39 is provided for moderating the lamp image. For example, an opaque white resin plate is generally used which is produced by blending inorganic filler or the like with an acrylic resin, polycarbonate or the like. The backlight 33 having such a structure is constructed so that the rays of light emitted from the lamp 38 exit from the entire face of the front face.

In the liquid crystal display module, the polarization components that run along the transmission axial orientation of the reflection polarizing plate 32 among the rays of light outgoing from the front face of the backlight 33 followed by transmission of the optical sheet 10 and diffusion (rays of light that enter into the reflection polarizing plate 32) will transmit the reflection polarizing plate 32 and the back face side-polarizing plate 35, and then illuminate the liquid crystal cell 36. On the other hand, the polarization components that run along the reflection axial orientation among the rays of light that enter into the reflection polarizing plate 32 are reflected on the reflection polarizing plate 32 toward the back face side, and then reflected on the backlight 33 toward the front face side, whereby they are retroreflected to the reflection polarizing plate 32. In this reciprocal step, owing to the polarizing function of the substrate film 1 of the optical sheet 10, effective conversion to the transmission axial orientation of the reflection polarizing plate 32 and the back face side-polarizing plate 35 is carried out. Accordingly, the liquid crystal cell 36 is illuminated. As a theoretical action of this polarizing function of the retroreflected rays of light, about 90°-rotation of the polarization orientation of the linear polarization during the reciprocal transmission of the substrate film 1, or the like may be envisaged. Therefore, the liquid crystal display module can markedly enhance the utilization efficiency of the rays of light emitted from the lamp 38, and thus luminance heightening, energy saving, and thin modeling which have been socially demanded these days can be facilitated. In addition, because the liquid crystal display module has an immediate beneath type backlight 33 that exhibits a comparably isotropic polarization characteristic of the outgoing rays of light, the aforementioned polarizing function of the retroreflected rays of light reflected on the polarizing plate and the like can be effectively performed. Moreover, in the foregoing liquid crystal display module, the aforementioned polarizing function of the retroreflected rays of light can be imparted to the substrate film of the optical sheet which is generally provided, therefore, addition of another optical sheet is not necessary for the purpose of attaining the polarizing function. Accordingly, luminance heightening and energy saving can be facilitated while minimizing increase in cost.

The substrate film for optical sheets, the optical sheet and the liquid crystal display module of the present invention are not limited to those in the embodiment described above. For example, the present invention is applicable also to liquid crystal display modules having a reflection polarizing function at the back face side-polarizing plate of the liquid crystal display element, without having the reflection polarizing plate. Further, it is also applicable to opposed edge light type liquid crystal display modules, and similar effects to those of the immediate beneath type liquid crystal display module described above can be exerted. Additionally, on the substrate film for optical sheets may be laminated other layer such as an ultraviolet ray absorbing agent layer, a top coat layer and the like. Moreover, the optical layer of the optical sheet is not limited to the light diffusion layer shown in FIG. 2 or the micro lens array shown in FIG. 3, but may be constructed from, for example, multiple prism parts, cylindrical lens parts and the like arranged in stripes.

The microlens constructing the aforementioned microlens array may be formed into a partial shape of an ellipsoid whose long axis is directed to the normal line orientation. According to the microlens having a partial shape of an ellipsoid whose long axis is directed to the normal line orientation, spherical aberration, in turn, loss of the rays of light can be reduced, and optical functions such as a light condensing function to the front side, a diffusing function, a bending function to the normal line orientation and the like of the transmitted rays of light can be enhanced. Flat ratio ($R_L/R_S$) of the radius along the long axis ($R_L$) to the radius along the short axis ($R_S$) of this ellipsoid is preferably 1.05 or greater and 1.7 or less in an attempt to effectively reduce the spherical aberration of the microlens.

The microlens constructing the microlens array as described above may be also formed into a partial shape of an ellipsoid whose long axis is positioned approximately parallel to a certain horizontal orientation. According to the microlens having a partial shape of an ellipsoid whose long axis is positioned approximately parallel to a certain horizontal orientation, an anisotropy is involved in the optical function, and specifically, the optical function in the vertical orientation to the long axis is enhanced than the optical function in the parallel orientation to the long axis of the microlens.

In connection with the aforementioned ultraviolet ray absorbing agent, in place of or together with the means to allow the agent to be included in the binder 14 of the optical layer 11 described above, an ultraviolet ray absorption layer containing the ultraviolet ray absorbing agent can be also laminated, alternatively, the ultraviolet ray absorbing agent may be allowed to be included in the binder 16 of the sticking preventive layer 12 or the substrate film 1 for optical sheets. Also by such means, the ultraviolet ray emitted from the lamp of the backlight unit can be similarly cut off, and disruption of the liquid crystal layer by the ultraviolet ray can be prevented.

In connection with the aforementioned antistatic agent, in place of or together with the means to allow the agent to be included in the binder 14 of the optical layer 11 described above, an antistatic layer containing the antistatic agent can be laminated, alternatively, an antistatic agent can be included in the binder 16 of the sticking preventive layer 12 or the substrate film 1 for optical sheets. Also by such means, an antistatic effect may be developed on the optical sheet, therefore, disadvantages caused due to electrification with static electricity such as collecting dusts with friction, difficulties in overlaying with other sheet such as a prism sheet or the like can be prevented.

EXAMPLES

Hereinafter, the present invention will be explained in detail by way of Examples, however, the present invention should not be construed as being limited to the description of these Examples.

Production of Samples of Substrate Film for Optical Sheets

Samples of rectangular substrate films for optical sheets, exhibiting the angle of the crystal orientation with respect to the short side orientation of 0°, and having a retardation value of 16 nm (sample 1), 70 nm (sample 2), 110 nm (sample 3), 140 nm (sample 4), 170 nm (sample 5) and 320 nm (sample 6), respectively, were produced by sampling at different positions from an original film obtained through biaxially stretching a resin such as polyethylene terephthalate.

Experiment for Determining Relationship between Crystallographic Axial Angle α and Retardation Value with Face Luminance A liquid crystal display module which has a backlight, a reflection polarizing plate and a liquid crystal display element in this order from the back face side as shown in FIG. 4, and which exhibits the angle of the transmission axial orientations of the back face side-polarizing plate and the reflection polarizing plate of the liquid crystal display element with respect to the short side orientation being 0° was used. The substrate film for optical sheets of any one of the samples 1 to 6 was incorporated by sandwiching between the reflection polarizing plate and the backlight, and the face luminance was measured by altering the crystal orientation of this substrate film. Then, thus obtained face luminance was compared with that obtained without incorporating the substrate film for optical sheets. The results are shown in Table 1 below and the graph in FIG. 5.

TABLE 1

Results of Experiment for Determining Relationship between Crystallographic Axial Angle α and Retardation Value with Face Luminance

| Retardation value | | Sample 1 16 nm | Sample 2 70 nm | Sample 3 110 nm | Sample 4 140 nm | Sample 5 170 nm | Sample 6 320 nm | None |
|---|---|---|---|---|---|---|---|---|
| Crystal orientation | 0 | 2902 | 2902 | 2902 | 2902 | 2902 | 2902 | 2970 |
| | π/8 | 2902 | 2958 | 2970 | 3000 | 2963 | 2950 | |
| | π/4 | 2904 | 2965 | 3034 | 3063 | 3028 | 2958 | |
| | 3π/8 | 2904 | 2952 | 2980 | 3010 | 2972 | 2946 | |
| | π/2 | 2902 | 2903 | 2910 | 2904 | 2904 | 2902 | |

Unit of crystallographic axial angle α: rad;
Unit of luminance value: cd/m$^2$

Evaluation of Relationship between Retardation Value and Face Luminance

Figure 5:
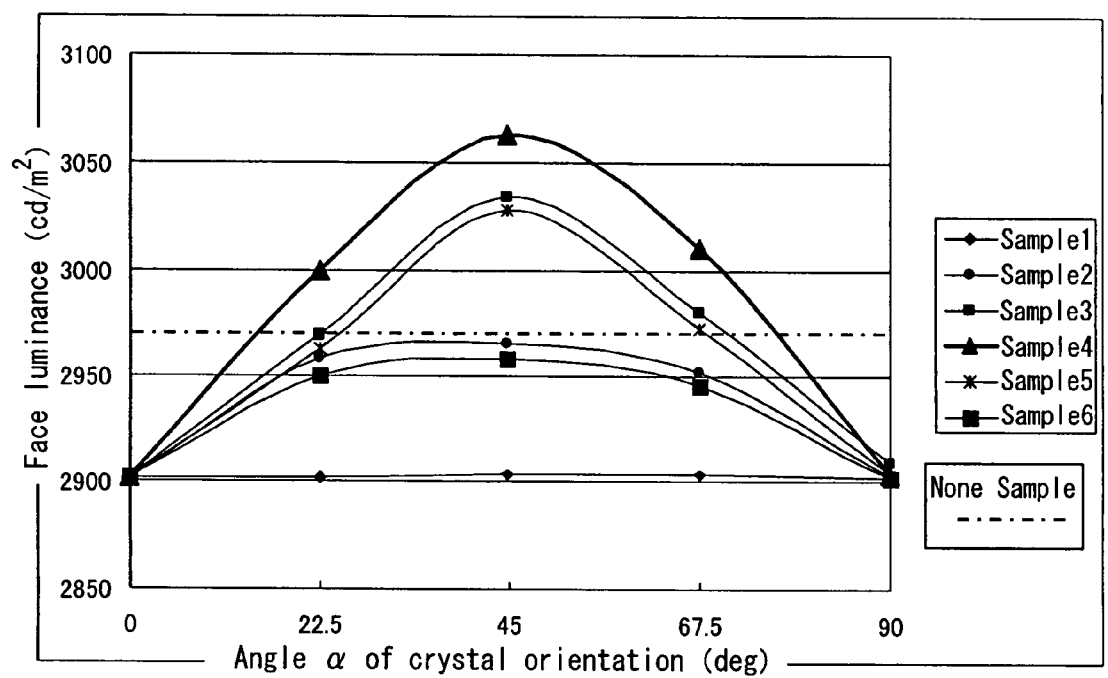
FIG. 5 shows a graph demonstrating a relationship between the crystallographic axial angle α and face luminance.
Figure 6:
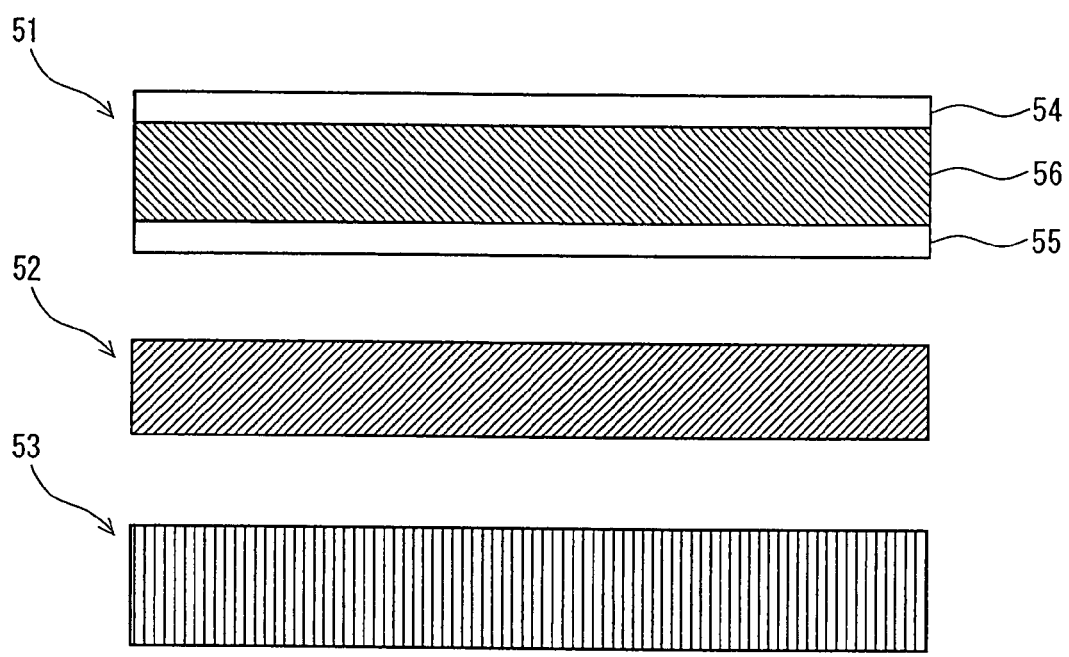
FIG. 6 shows a schematic cross-sectional view illustrating a general liquid crystal display module.
Figure 7:
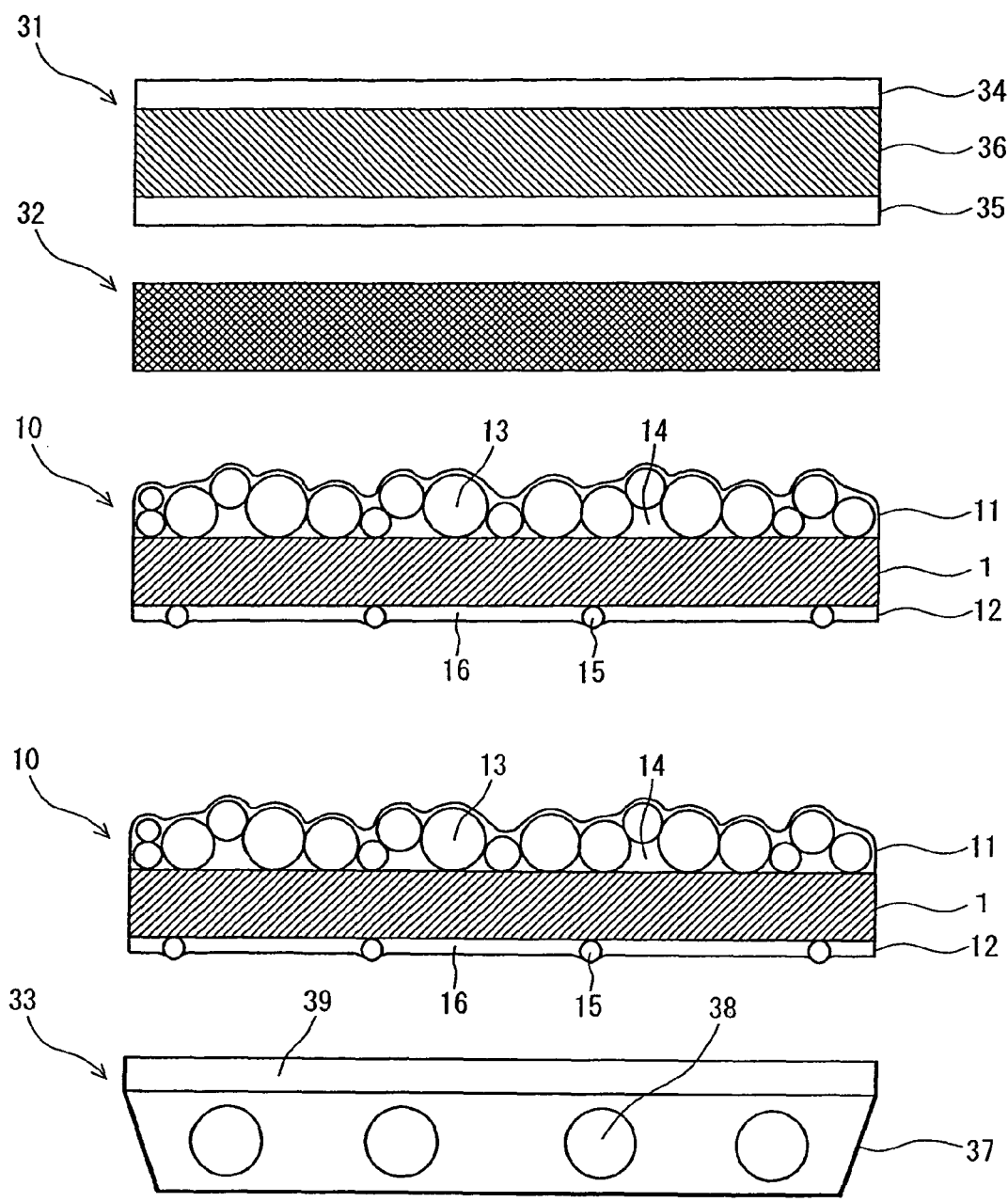
FIG. 7 shows a schematic cross-sectional view illustrating a liquid crystal display module having two optical sheets.

As shown in Table 1 and the graph in FIG. 5, when the substrate film for optical sheets of any one of the samples 2 to 6 having a retardation value of 70 nm or greater and 320 nm or less was superposed, effect of increasing the face luminance could be achieved as compared with the case in which no sample was incorporated. It will be noted that when the substrate film for optical sheets of any one of the samples 2 and 6 was superposed, approximately similar face luminance was obtained in terms of the peak luminance as compared with the case in which no sample was incorporated. However, since one or more optical sheets are usually superposed in liquid crystal display modules, it is revealed that the effect of increasing the luminance could be achieved when the substrate film for optical sheets was used as the substrate film of this optical sheet. Particularly, when the substrate film for optical sheets of any one of the samples 3 to 5 having a retardation value of 110 nm or greater and 170 nm or less was superposed, the effect of increasing the luminance by 3% or more was achieved, which has been accepted as a high added value in market, as compared with the case in which the substrate film for optical sheets of the sample 1 was superposed. Moreover, the greatest effect of increasing the luminance could be achieved when the substrate film for optical sheets of the sample 4 having a retardation value of 140 nm was superposed. From the foregoing results of evaluation with respect to the retardation value, adequacy of the numerical range of the retardation value of the substrate film for optical sheets specified according to the present invention as described above was demonstrated.

Evaluation of Relationship between Crystallographic Axial Angle α and Face Luminance As shown in Table 1 and the graph in FIG. 5, when the substrate film for optical sheets of any one of the samples 2 to 6 having a retardation value of 70 nm or greater and 320 nm or less was superposed, effect of increasing the face luminance could be achieved in the case in which the angle α of crystal orientation with respect to the short side orientation was π/8 or greater and 3π/8 or less, as compared with the case in which no substrate film for optical sheets was employed. It will be noted that when the substrate film for optical sheets of any one of the samples 2 and 6 was superposed, approximately similar face luminance was obtained as compared with the case in which no sample was incorporated. However, similarly to the evaluation of the retardation value as described above, it is revealed that the effect of increasing the luminance could be achieved in effect. Particularly, when the angle α of the crystal orientation was 3π/16 or greater and 5π/16 or less, the difference in luminance falls within the range of approximately ±1% of the peak luminance. Accordingly, almost equivalent luminance to the peak luminance was obtained, suggesting that variance of the luminance could be lessened. Furthermore, when the angle α of the crystal orientation was π/4, the highest face luminance was developed. In addition, also in the case of the angle α of the crystal orientation having a negative value, similar face luminance to those in the foregoings can be developed. From the foregoing results of evaluation of the crystallographic axial angle α, adequacy of the numerical range of the crystallographic axial angle α specified according to the present invention as described above was demonstrated.

INDUSTRIAL APPLICABILITY

As described hereinabove, the substrate film for optical sheets, the optical sheet and the liquid crystal display module of the present invention are useful as constitutive elements for liquid crystal display devices, and are particularly suited for use in transmissive liquid crystal display devices.

What is claimed is:

1. A rectangular liquid crystal display module having a frontward face and a rearward face, comprising:
a liquid crystal display element, including a liquid crystal cell having a first polarizing plate positioned immediately adjacent to a front face of the liquid crystal cell and a reflection polarizing plate positioned immediately adjacent to a rear face of the liquid crystal cell;
an optical sheet positioned rearward of the liquid crystal cell and reflection polarizing plate; and
an opposed edge light type surface illuminant backlight positioned rearward of the optical sheet;
wherein the optical sheet comprises:
a substrate film formed into a rectangular shape and made of a resin; and
an optical layer laminated on one face of the substrate film, wherein said substrate film has an optical anisotropy, an absolute value of an angle of crystal orientation with respect to a short side orientation is π/8 or greater and 3π/8 or less, and a retardation value is between 70 nm to 320 nm.

2. The liquid crystal display module according to claim 1 wherein the substrate film comprises a matrix resin selected from polyethylene terephthalate and polycarbonate.

3. The liquid crystal display module according to claim 1, wherein the optical layer comprises multiple particles of a light diffusing agent and a binder therefor.

4. The liquid crystal display module according to claim 1, wherein the optical layer has a shape with micro recessions and protrusions having refractivity.

5. The liquid crystal display module according to claim 1, wherein the optical sheet has on another face of the substrate film a sticking preventive layer that includes beads dispersed in a binder.

6. The liquid crystal display module according to claim 1, wherein another optical sheet is provided between the liquid crystal display element and the backlight, and
a low-retardation film is used as a substrate film of the other optical sheet.

7. A rectangular liquid crystal display module having a frontward face and a rearward face, comprising:
a liquid crystal display element, including a liquid crystal cell and first and second polarizing plates, the liquid crystal cell being positioned rearward of the first polarizing plate and frontward of the second polarizing plate;
a reflection polarizing plate positioned rearward of the liquid crystal cell second polarizing plate;
an optical sheet positioned rearward of the liquid crystal display element and reflection polarizing plate; and
an opposed edge light type surface illuminant backlight positioned rearward of the optical sheet;
wherein the optical sheet comprises:
a substrate film formed into a rectangular shape and made of a resin; and
an optical layer laminated on one face of the substrate film, wherein said substrate film has an optical anisotropy, an absolute value of an angle of crystal orientation with respect to a short side orientation is π/8 or greater and 3π/8 or less, and a retardation value is between 70 nm to 320 nm.

\* \* \* \* \*